(12) United States Patent
Sankaran

(10) Patent No.: US 8,529,749 B2
(45) Date of Patent: Sep. 10, 2013

(54) ELECTROCHEMICAL CELL INCLUDING A PLASMA SOURCE AND METHOD OF OPERATING THE ELECTROCHEMICAL CELL

(75) Inventor: R. Mohan Sankaran, University Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 299 days.

(21) Appl. No.: 12/852,092

(22) Filed: Aug. 6, 2010

(65) Prior Publication Data

US 2011/0048960 A1 Mar. 3, 2011

Related U.S. Application Data

(60) Provisional application No. 61/274,315, filed on Aug. 13, 2009.

(51) Int. Cl.
*C25C 5/02* (2006.01)
*C25C 7/02* (2006.01)
*C25C 1/20* (2006.01)

(52) U.S. Cl.
USPC ..... 205/560; 205/571; 205/793.5; 204/230.2; 204/242

(58) Field of Classification Search
None
See application file for complete search history.

(56) References Cited

U.S. PATENT DOCUMENTS

| 4,964,973 A * | 10/1990 | Donahue et al. ............. 205/371 |
| 2003/0052011 A1* | 3/2003 | Chen ............................... 205/80 |
| 2006/0042251 A1* | 3/2006 | Villalobos ....................... 60/670 |
| 2008/0223712 A1 | 9/2008 | Min et al. |
| 2008/0277272 A1* | 11/2008 | Pierce et al. .................. 204/164 |
| 2010/0101942 A1* | 4/2010 | Pless .............................. 204/269 |
| 2010/0187091 A1* | 7/2010 | Pierce et al. .................. 204/164 |

OTHER PUBLICATIONS

Pierce et al, U.S. Appl. No. 60/755,933, filed Jan. 3, 2006, claimed for priority by Pierce et al in U.S. Appl. No. 12/159,689, filed Jul. 2, 2008.*
Chang, F-C.; Richmonds, C.; Sankaran, R.M. "Microplasma-Assisted Growth of Colloidal Ag Nanoparticles for Point-of-Use Surface-Enhanced Raman Scattering Applications," *J. Vac. Sci. Technol. A*, 2010, 28, pp. L5-L8.
Chiang, W-H.; Richmonds, C.; Sankaran, R.M. "Continuous-Flow, Atmospheric-Pressure Microplasmas: A Versatile Source for Metal Nanoparticle Synthesis in the Gas or Liquid Phase," *Plasma Sources Sci. Technol.*, 2010, 19, pp. 1-8.
Datta, M. "Anodic Dissolution of Metals at High Rates," *IBM J. Res. Develop.*, 1993, 37, pp. 207-226.

(Continued)

*Primary Examiner* — Harry D Wilkins, III
(74) *Attorney, Agent, or Firm* — Brinks Hofer Gilson & Lione

(57) ABSTRACT

An electrochemical cell includes a container at atmospheric pressure comprising a liquid electrolyte and a first electrode at least partially immersed in the electrolyte. A plasma source is spaced apart from a surface of the electrolyte by a predetermined spacing, and a plasma spans the predetermined spacing to contact the surface of the electrolyte. A method of operating the electrochemical cell entails providing a first electrode at least partially immersed in a liquid electrolyte and producing a plasma in contact with a surface of the electrolyte at atmospheric pressure. The plasma acts as a second electrode, and a current is generated through the electrolyte. Electrochemical reactions involving at least the second electrode are initiated in the electrolyte.

26 Claims, 8 Drawing Sheets

(56) References Cited

OTHER PUBLICATIONS

Furusho, H.; Kitano, K.; Hamaguchi, S.; Nagasaki, Y. "Preparation of Stable Water-Dispersible PEGylated Gold Nanoparticles Assisted by Nonequilibrium Atmospheric-Pressure Plasma Jets," *Chem. Mater.*, 2009, 21, pp. 3526-3535.

Kaneko, T.; Baba, K.; Hatakeyama, R. "Gas-Liquid Interfacial Plasmas: Basic Properties and Applications to Nanomaterial Synthesis," *Plasma Phys. Control. Fusion*, 2009, 51, pp. 1-8.

Richmonds, C.; Sankaran, R.M. "Plasma-Liquid Electrochemistry: Rapid Synthesis of Colloidal Metal Nanoparticles by Microplasma Reduction of Aqueous Cations," *Appl. Phys. Lett.*, 2008, 93, pp. 131501-1-3.

* cited by examiner

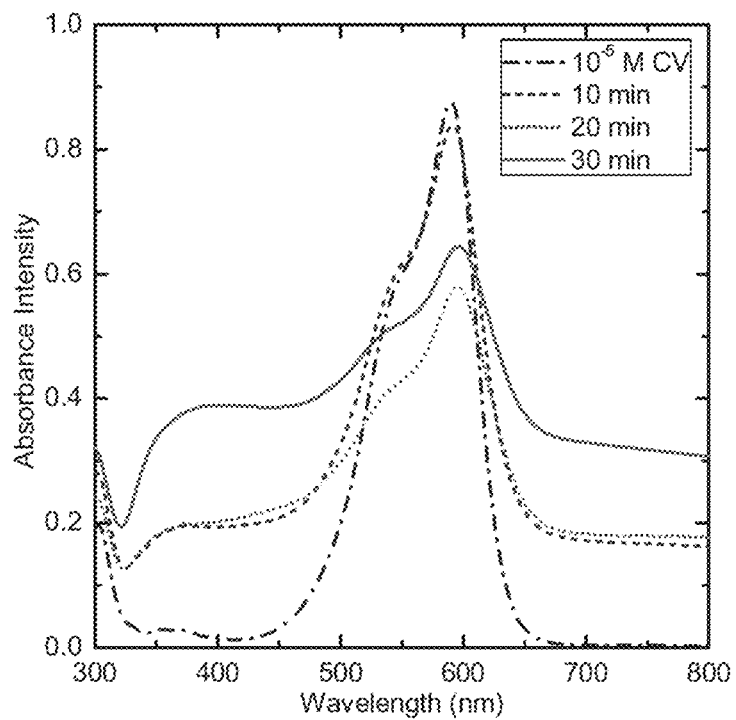
Fig. 5(c)
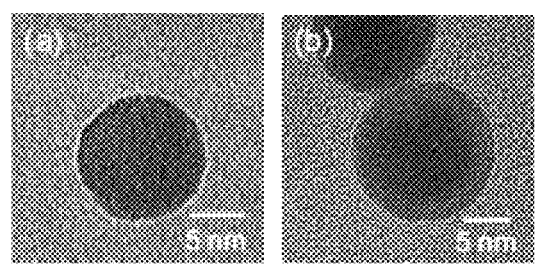
Fig. 6(a)
Fig. 6(b)
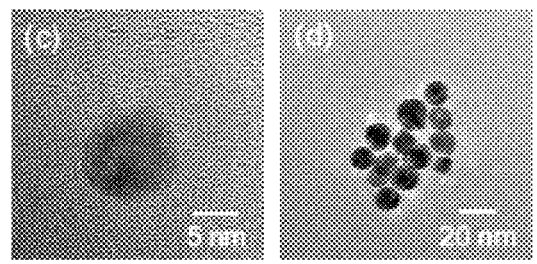
Fig. 6(c)
Fig. 6(d)

ELECTROCHEMICAL CELL INCLUDING A PLASMA SOURCE AND METHOD OF OPERATING THE ELECTROCHEMICAL CELL

RELATED APPLICATION

The present patent document claims the benefit of the filing date under 35 U.S.C. §119(e) of Provisional U.S. Patent Application Ser. No. 61/274,315, filed Aug. 13, 2009, which is hereby incorporated by reference.

FEDERALLY SPONSORED RESEARCH OR DEVELOPMENT

The present invention was made in part with U.S. government support under grant no. CBET-0746821 awarded by the National Science Foundation. The U.S. government may have certain rights in this invention.

TECHNICAL FIELD

The present disclosure is related generally to electrochemical cells and more particularly to electrochemical cells that utilize a plasma as an electrode.

BACKGROUND

Plasmas are gaseous discharges widely used to modify the surface properties of materials. Plasma-based surface processes, such as etching and deposition of thin films, are vitally important to the manufacturing of integrated circuits (ICs) in the electronics industry. Typical plasmas (also known as "glow discharges") are formed by ionizing a gas between solid electrodes using either radio-frequency (rf) or direct current (dc) power.

While most industrial applications employ plasmas for chemical modification of solid surfaces, there have been a small number of experiments dating back to more than a hundred years ago in which the use of low-pressure plasmas was investigated for gas-liquid interactions. Applications of this technology, know as glow discharge electrolysis, remain elusive, however, because stable discharge operation of the plasma requires a vacuum environment, which restricts potential electrolytes to those with extremely low vapor pressures, such as ionic liquids or solid oxides.

BRIEF SUMMARY

An electrochemical cell that employs a plasma source and a method of operating the electrochemical cell are described herein. A method of producing metal nanoparticles is also described.

The electrochemical cell has a closed circuit configuration including a container at atmospheric pressure comprising a liquid electrolyte. A first electrode is at least partially immersed in the electrolyte. A plasma source is spaced apart from a surface of the electrolyte by a predetermined spacing, and a plasma spans the predetermined spacing to contact the surface of the electrolyte.

The method of operating the electrochemical cell entails providing a first electrode at least partially immersed in a liquid electrolyte and producing a plasma in contact with a surface of the electrolyte at atmospheric pressure. The plasma acts as a second electrode, and a current is generated through the electrolyte. Electrochemical reactions involving at least the second electrode are initiated in the electrolyte.

The method of producing metal nanoparticles comprises providing a first electrode at least partially immersed in a liquid electrolyte and producing a plasma in contact with a surface of the electrolyte at atmospheric pressure. The plasma acts as a second electrode, and a current is generated through the electrolyte. Metal ions in the electrolyte are reduced by free electrons from the plasma to form metal nanoparticles in the electrolyte.

BRIEF DESCRIPTION OF THE DRAWINGS

FIGS. 5(a)-5(c) show UV-vis absorbance spectroscopy of (a) Ag colloids prepared from Ag foil for process intervals of 5, 10, and 15 minutes; and (b) Au colloids prepared from Au foil for process intervals of 10, 15 and 30 minutes; and (c) solutions of Ag nanoparticles grown with $10^{-5}$ CV for different process times;

FIGS. 6(a)-6(d) show TEM images of (a) Ag nanoparticles synthesized from anodic dissolution of Ag foil and microplasma reduction (process time=10 minutes), (b) Ag nanoparticles synthesized from anodic dissolution of Ag foil and microplasma reduction (process time=30 minutes), (c) Ag nanoparticles synthesized from microplasma reduction of aqueous $AgNO_3$ solution (process time=10 minutes) and (d) Au nanoparticles synthesized from microplasma reduction of aqueous $HAuCl_4$ (process time 10 minutes);

DETAILED DESCRIPTION

Recently, spatially confining plasmas to dimensions of 1 mm or less has led to the generation of stable glow discharges at atmospheric pressure. Microplasmas are a unique class of gaseous discharges that operate nonthermally at high pressures, in contrast to arcs. While possessing properties similar to low-pressure glows, microplasmas may be formed in a hollow cathode geometry that can result in a drastic increase in ionization processes through the oscillatory motion of electrons. As a result, microplasmas are characterized by high current densities, high-pressure operation (up to and exceeding atmospheric pressure), and relatively low gas temperatures.

The inventor has recognized that a microplasma may be coupled with a liquid electrolyte to create a gas-liquid electrochemical cell, where the microplasma functions as a cathode. The presence of electrons and ions in the gas discharge leads to current flow through an aqueous solution which drives electrochemical reactions, such as metal dissolution at the anode and reduction of aqueous metal cations at the cathode. Among the advances made possible by the inventive electrochemical technique is the synthesis of high purity metal nanoparticles.

Figure 1:
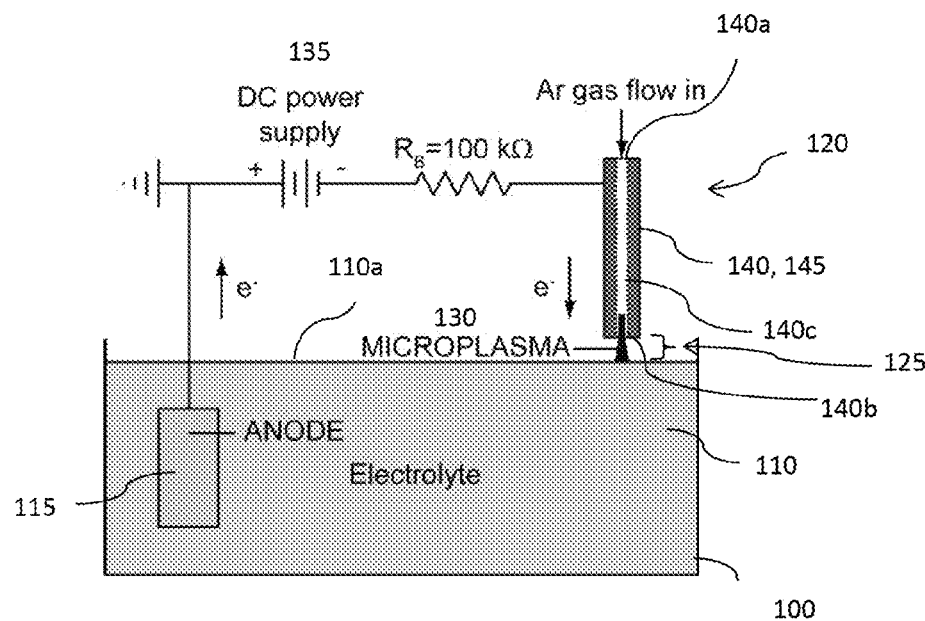
FIG. 1 is a schematic of an exemplary electrochemical cell according to the present disclosure.

Referring to FIG. 1, the electrochemical cell 100 includes a container 105 holding a liquid electrolyte 110. The container 105 is at atmospheric pressure, and a first electrode 115 is at least partially immersed in the electrolyte 110. A plasma source 120 is spaced apart from a surface 110a of the electrolyte 110 by a predetermined spacing 125 which is adapted for generating a plasma 130 in contact with the surface 110a of the electrolyte 110 at atmospheric pressure. Typically, the predetermined spacing is between about 0.5 mm and about 5 mm. The plasma source 120 is electrically connected to a power supply 135, and the first electrode 115 is electrically connected to ground.

The plasma source 120 may take the form of a hollow conductive body 140 including a first opening 140a and a second opening 140b and a cavity therebetween 140c. The first opening 140a serves as a gas inlet to the cavity 140c, and the second opening 140b is separated from the surface 110a of the electrolyte 110 by the predetermined spacing 125. The hollow conductive body 140 may be a conductive tube 145, as shown in FIG. 1, that functions as a cathode ("hollow cathode") during operation of the plasma. The conductive tube 145 generally has a substantially uniform diameter along the length of the cavity 140c. To obtain hollow cathode operation at high pressures (e.g., atmospheric pressure) the cavity 140c of the tube 145 is preferably about 250 microns or less in diameter. Typically, the diameter is about 200 microns or less, such as from about 100 microns to about 200 microns. Accordingly, the plasma source 120 is suitable for generating a microplasma 130, and may be referred to as a microplasma source. Such microplasma sources are described in detail in U.S. patent application Ser. No. 12/403,055, which was filed on Mar. 12, 2009, and is hereby incorporated by reference in its entirety.

Figure 2:
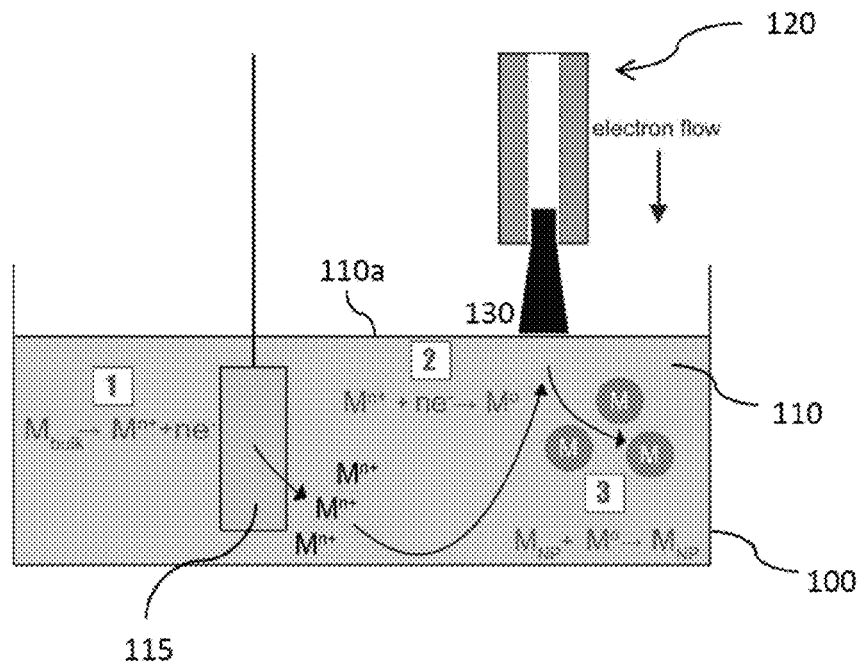
FIG. 2 is a schematic showing electrochemical reactions that may occur in the electrochemical cell of FIG. 1.

The formation of the microplasma 130 results from supplying an inert gas, such as Ar or He, with energy to ionize the gas so that free electrons may be introduced into the electrolyte solution 110. The first electrode 115 may serve as a source of metal ions ($M^{n+}$, where M is a metal such as Ag or Au), which are understood to migrate to the plasma electrode 130 where the ions interact with the free electrons. Metal nanoparticles may then be formed. Referring to FIG. 2, three steps in the formation of metal particles are proposed here:

(1)

(2)

(3)

First, the metal electrode, which may be a metal foil, releases ions ($M^{n+}$) into the solution as shown in equation (1). Equation (2) shows the reduction of the ions by free electrons ($ne^-$) at the plasma electrode to form metal nanoparticles ($M^o$). Finally, the metal nanoparticles ($M^o$) can react with metal ions ($M^{n+}$) to form larger nanoparticles ($M_{NP}$). This final step (equation (3)) is autocatalytic and may result in faster kinetics.

Replacing the solid cathode of a conventional electrochemical cell with a plasma discharge allows current to be conducted through the electrolyte while rendering one of the electrodes "contactless." Charged, energetic species present in the microplasma may be accelerated toward the surface of the solution to initiate electrochemical reactions through gas-liquid interactions. The strategy may enable facile, rapid production of high-purity nanometer-sized metal particles directly from bulk metals or aqueous metal salts. The plasma cathode permits nanoparticles to freely nucleate, grow, and disperse. Stabilizer molecules can be used to bind to the particle surface and prevent excessive growth and agglomeration.

Referring again to FIG. 1, the first electrode 115 may be fully immersed in the electrolyte 110. Alternatively, the first electrode 115 may be partially immersed in the electrolyte 110. The first electrode 115 is generally a metal selected from the group consisting of Ag, Al, Au, Fe, Pt, and Cu. Typically, the electrolyte 110 is an aqueous solution which may include an acid for conductivity. The acid may be selected based on its ability to etch the first electrode 115. For example, suitable acids may include $HNO_3$ in the case of a silver first electrode 115 or HCl in the case of a gold first electrode 115. The electrolyte 110 may also include a stabilizer for the purpose of preventing uncontrolled particle growth and agglomeration when the electrochemical cell is employed to form metal nanoparticles. The stabilizer may be fructose, mercaptosuccinic acid or another suitable water-soluble surfactant. For some applications, a metal salt may be added to the electrolyte 110 to serve as a source of metal ions in lieu of the first electrode 115. In such cases, to avoid etching the first electrode 115, an acid may not be used. Suitable metal salts may include, for example, $AgNO_3$, $HAuCl_4$, or $H_2PtCl_6$.

Figure 3:
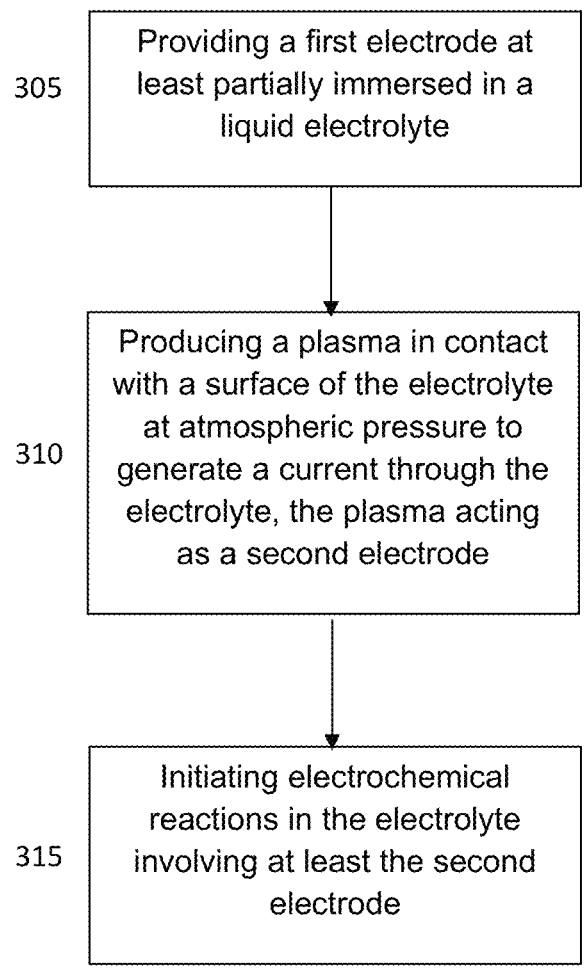
FIG. 3 is a flow chart showing steps of a method to operate the electrochemical cell.

Referring now to the flow chart of FIG. 3, a method of operating an electrochemical cell includes providing a first electrode 305 at least partially immersed in a liquid electrolyte, and producing a plasma 310 in contact with a surface of the electrolyte at atmospheric pressure to generate a current through the electrolyte, where the plasma acts as a second electrode. Electrochemical reactions are initiated 315 in the electrolyte involving at least the second electrode. The electrochemical reactions include reduction of metal ions in the electrolyte by free electrons from the plasma.

The current generated through the electrolyte is generally between about 1 mA and 10 mA. The electrochemical reactions may include anodic dissolution of the first electrode to supply the metal ions. Alternatively, a metal salt included in the electrolyte may serve as the source of the metal ions.

To produce the plasma, an inert gas may be flowed through a hollow conductive body (e.g., the conductive tube 145 of FIG. 1) that includes a first opening 140a and a second opening 140b and a cavity 140c therebetween, and a voltage may be applied across the hollow conductive body 140 and the first electrode 115. Typically, a voltage of at least 2 kV is used to ignite the plasma, and a voltage of from about 200 V to 1000 V may be utilized for sustaining the plasma. The voltage may be a dc voltage. As described above in reference to FIG. 1, the first opening 140a serves as the gas inlet to the cavity 140c and the second opening 140b is separated from the surface 110a of the electrolyte 110 by a predetermined spacing 125. The microplasma 130 spans the predetermined spacing 125 to contact the surface 140a of the electrolyte 140.

Two exemplary approaches to operating the electrochemical cell are described below. In both examples, the cell is employed to form metal nanoparticles.

Approach Based on Anodic Dissolution of a Metal Electrode

One approach to operating the inventive electrochemical cell includes anodic dissolution of a metal electrode in the electrolyte, followed by reduction of aqueous metal cations with gas-phase electrons directed from the microplasma.

Metal foils of Ag or Au may be placed inside a liquid electrolyte, which may include 1 mM $HNO_3$ for Ag or 1 mM HCl for Au and 0.01 M fructose in de-ionized water, for example. The chemicals may be obtained from Fisher Scientific, Inc. The foil may be 1×1 cm² in area and 0.001 in. thick, such as those available from ESPI Metals, Inc. The acid is employed to make the solution conductive; the fructose is a stabilizer that may prevent uncontrolled particle growth and agglomeration. Mercaptosuccinic acid may also be used as a stabilizer in the aqueous solution. A stainless steel capillary tube is positioned 3 cm away from the metal foil with a gap of 2 mm between the tube end and the liquid surface. Other spacings of the capillary tube from the metal foil, such as between about 1 cm and 10 cm, and from the liquid surface, such as between about 1 mm and 10 mm, may also be suitable. The capillary tube may have dimensions of 180 μm in inside diameter and 5 cm in length, and may be obtained from Varian, Inc.

Gas flow is coupled to the capillary tube and set by a mass flow controller. A flow rate of 25 SCCM of argon, where SCCM denotes cubic centimeters per minute at STP, may be used. Helium or another inert and/or reactive gas may alternatively (or also) be employed to generate the plasma.

Figure 4A:
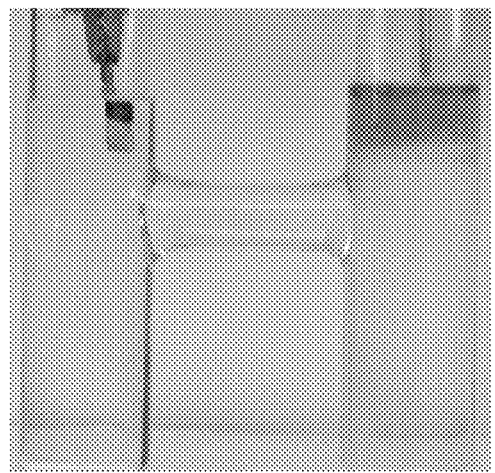
FIGS. 4(a)-4(c) are photos of the formation of metal nanoparticles in an electrolyte solution during operation of the electrochemical cell.
Figure 4B:
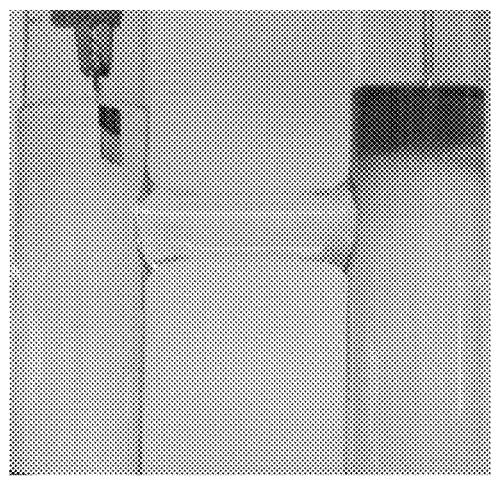
Figure 4C:
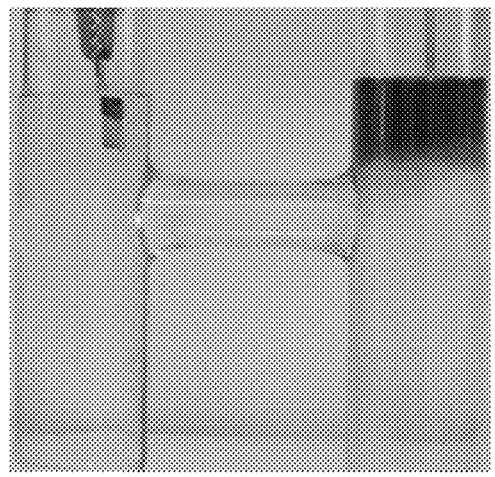

The electrochemical cell may be operated with a negatively biased dc power supply with the capillary tube as the cathode and the metal foil as the anode, as shown by the schematic in FIG. 1. To ignite the microplasma, a high voltage of 2 kV may be applied; following gas breakdown, the discharge current may be controlled by a ballast resistor and by adjusting the power supply voltage. The source voltage is distributed in series through the ballast resistor, discharge, and cell at constant current. The discharge current may be kept constant at 5 mA for the duration of the experiments. Generally, no stirring is applied to the solution to avoid agitation that may cause discharge instabilities. As the atmospheric-pressure microplasma impinges directly on the surface of the solution, the liquid changes color within minutes, indicating colloidal metal nanoparticle growth. The increased coloration (darkening) of the electrolyte solution is evident in FIGS. 4(a)-4(c).

Figure 5A:
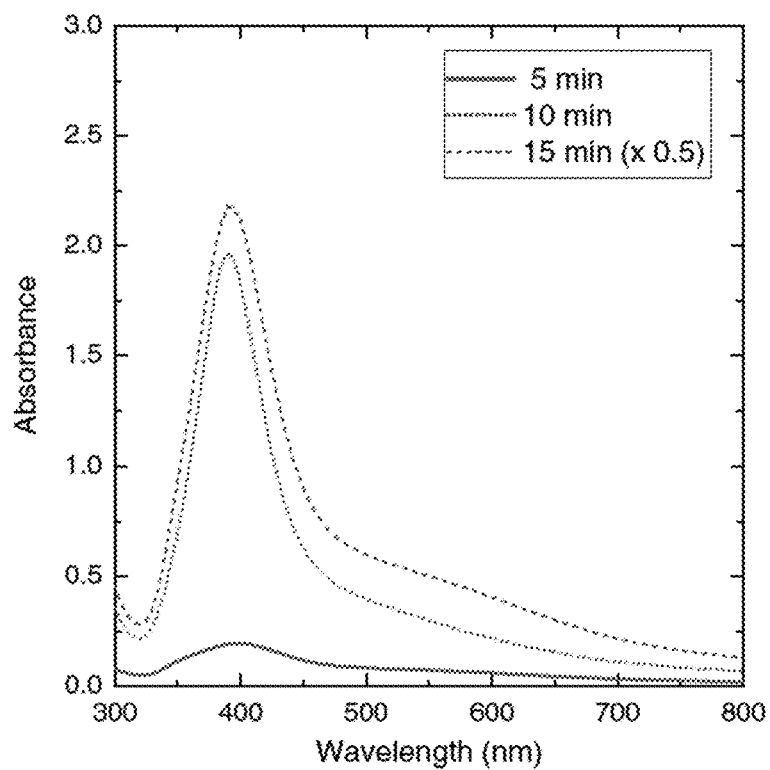
Figure 5B:
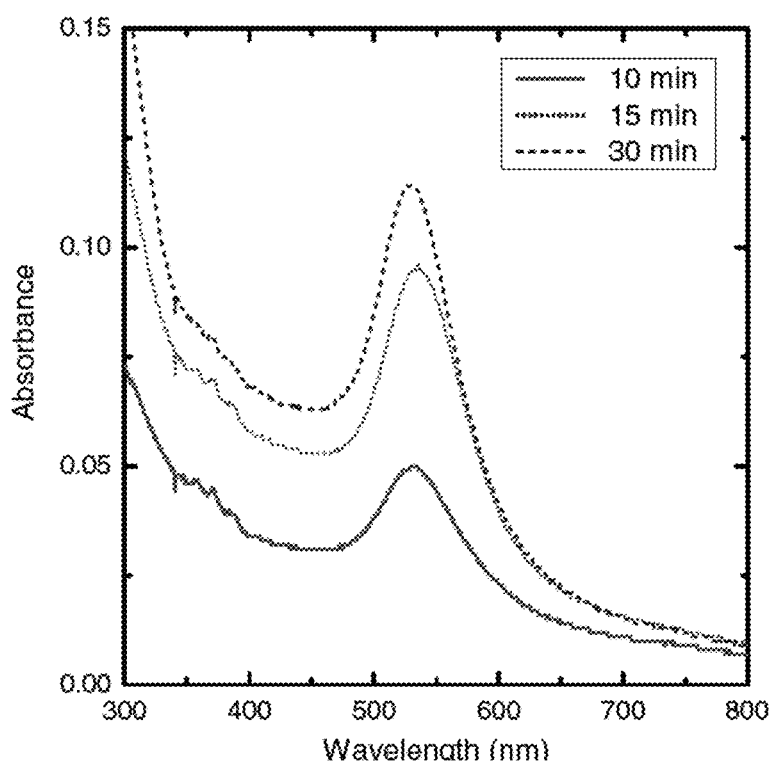

Particle growth may be monitored by ultraviolet-visible (UV-vis) absorbance spectroscopy using a Shimadzu UV-1800 spectrometer, and background spectra from de-ionized water can be subtracted from the profile. A plasmon band at ~400 nm, characteristic of spherical Ag nanoparticles, appears and grows in intensity for increasing reaction times with Ag foil, as shown in FIG. 5(a). Corresponding images of the solutions show that the particles are well dispersed and do not precipitate. The rate of reduction is indicated by the enormous absorbance, particularly after 15 min, which shows that a high density of particles is rapidly synthesized. Similar time-dependent results are obtained for Au with a plasmon band appearing at ~530 nm, characteristic of spherical Au nanoparticles, as shown in FIG. 5(b). In comparison, Au particles grow slower, but also produce stable colloids.

The morphology of as-grown colloidal metal nanoparticles is evaluated by transmission electron microscopy (TEM). Solutions of metal colloids are diluted by a factor of 100 and drop cast onto carbon-coated copper grids. Micrograph images are obtained with a Philips Tecnai F30 field emission high-resolution TEM operated at 300 kV. Examination of Ag particles grown from metal foil reveals substantially nonagglomerated, uniform, spherical, and crystalline particles approximately 10 nm in size, as shown in FIGS. 6(a)-6(c). The high-resolution TEM image shows a lattice spacing of 0.20 nm which corresponds to the (200) crystalline plane of face centered cubic (fcc) Ag. A representative TEM image (FIG. 6(d)) of Au particles prepared from metal foil similarly shows high-quality particles of approximately 10 nm in diameter.

The disparity in particle growth rates between Ag and Au observed from UV-vis absorbance spectroscopy in metal foil experiments is related to the initial step involving anodic dissolution of the bulk metal. Metal dissolution depends on several factors, including the electrolyte composition, current density, applied cell potential, and the stoichiometry of the half-cell reactions. Since experiments with both metals were performed at the same cell conditions (that is, the same current and voltage) it is postulated that the anodic dissolution of Ag occurs at a higher rate than Au because of the differing standard oxidation potentials (−0.80 V for Ag versus −1.52 V for Au) and number of electrons (1 mol for Ag versus 3 mol for Au) associated with the respective half-cell reactions. Consequently, the rate of Ag cation formation may be higher than Au cation formation, leading to faster particle growth for Ag. However, the interaction of the metal with the electrolyte may still complicate this overall picture. Assuming all cations released from the respective metal foils are reduced by the microplasma, mass production rates of 0.34 mg/min and 0.20 mg/min may be estimated for Ag and Au colloids, respectively.

Approach Based on Metal Salt Solutions

A second approach to operating the inventive electrochemical cell entails providing a dilute concentration of a metal salt in the electrolyte instead of utilizing a metal electrode to provide the metal cations for the process.

Suitable liquid electrolytes may be prepared with a metal salt and a stabilizer in an aqueous solution. For example, 0.1 mM of $AgNO_3$ or 1 mM of $HAuCl_4$ and 0.01 M of fructose in de-ionized water may be employed. A noble metal foil is used to make electrical contact to the electrolyte and is operated as the anode. For example, a Pt foil of 1×1 cm² in area and 0.001 m in thickness, which is available from ESPI Metals, Inc., may be employed. These experiments effectively remove the anodic dissolution step which may limit the particle growth rate and allow direct reduction of aqueous metal cations by the microplasma. Discharges are formed with the metal salt solutions as previously described, albeit without any acid, and found to induce similarly rapid particle growth. TEM of Ag particles produced from reducing aqueous $AgNO_3$ with a microplasma shows the presence of particles of less than about 10 nm in diameter, as shown in the micrograph of FIG. 6(c). The versatility of the process is shown by experiments with $HAuCl_4$ which also yield crystalline particles with a mean diameter of about 10 nm, as shown in FIG. 6(d), and an fcc crystal structure.

Figures 7A, 7B:
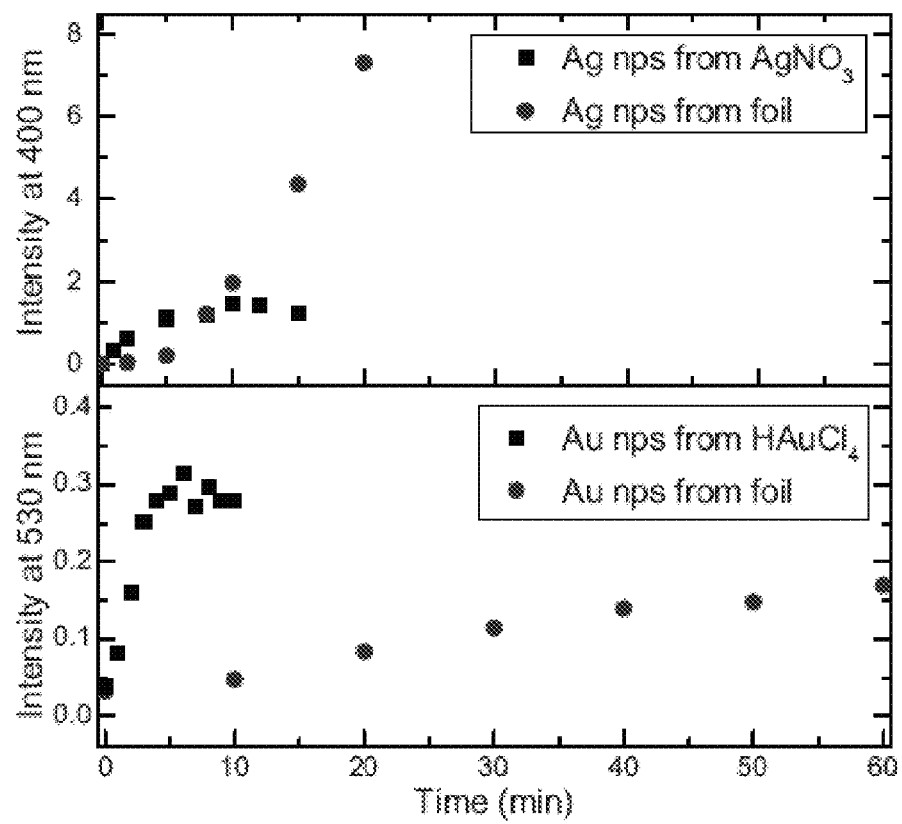
FIGS. 7(a)-7(b) show (a) time dependent absorbance intensity at 400 nm for Ag colloids synthesized from Ag foil and $AgNO_3$, and (b) time dependent absorbance intensity at 530 nm for Au colloids synthesized from Au foil and $HAuCl_4$.

The kinetics of particle growth for the metal foil and metal salt experiments are compared by time-dependent UV-vis absorption measurements. The absorbance intensity at 400 nm for Ag colloids synthesized from Ag foil is found to increase slowly at initial times, and then rapidly after approximately 5 min, as indicated in FIG. 7(a). The plasmon resonance peak maximum continues to increase even at long times (e.g., about 20 min). In comparison, the absorbance intensity at 400 nm for Ag colloids synthesized from $AgNO_3$ increases at a higher initial rate, but saturates at approximately 10 min, as shown in FIG. 7(a). Results for the absorbance intensity at 530 nm for Au colloids are analogous; experiments with Au foil show a slow increase that continues for a long period of time (e.g., about 60 min) while experiments using $HAuCl_4$ exhibit a rapid initial increase followed by saturation, as shown in FIG. 7(b). These trends are consistent with an autocatalytic process where the growth kinetics depend on the initial concentration of metal cations and/or small metal particles. For metal foil experiments, no metal cations are initially present, which may lead to a short induction time during which anodic dissolution occurs and cations migrate to the microplasma. When a metal salt solution is used, the cations may be reduced immediately, resulting in almost instantaneous particle growth. However, whereas there is an essentially infinite reservoir of metal cations for the metal foil experiments, experiments with the metal salt solutions no longer produce particles when all the available cations have been reduced by the microplasma. This result suggests that in the case of metal salt solutions, the growth process is no longer controlled by anodic dissolution and depends substantially entirely on the reduction of metal cations by the microplasma. It should be noted that the growth kinetics for both metal foil and metal salt solution experiments are linked to various process parameters, including current density, acid or metal salt concentration, and stabilizer concentration.

In a standard electrochemical cell, redox reactions occur by flowing current between solid electrodes and the electrolyte. As a source of electrons and ions, plasma discharges can be coupled to electrochemical systems to initiate redox reactions without immersing a solid electrode in the electrolyte solution. The findings described here open a route for electrochemical applications based on plasma-liquid interactions. The reduction of metal cations by gas-phase electrons supplied by a microplasma may provide a generic approach for nanoparticle synthesis from either bulk metals or metal salt solutions. In addition to using the available electrons in a plasma discharge, the methodology may also allow reactive gases to be incorporated into an electrochemical cell and lead to plasma processing of liquid-phase materials.

Application of the Technology to Analyte Detection

It is further demonstrated that microplasma reduction can be performed in the presence of an analyte molecule and facilitate sample analysis by surface-enhanced Raman scattering (SERS). Unlike other colloidal synthesis routes, the nanoparticles may be prepared in a single step without a foreign stabilizer molecule, which has been found to interfere with the desired Raman signal from the analyte. It is found that the Raman signal from a test molecule (crystal violet (CV) in the examples described below) is significantly enhanced by this approach, with a lower detection limit of $10^{-10}$ M.

A summary of the detection technique is provided here, followed by a description of a set of experiments carried out to evaluate the technology. To apply the nanoparticle synthesis technology to analyte detection, a first electrode is at least partially immersed in a liquid electrolyte. The electrolyte may include an analyte molecule such as CV, a protein, *E. coli*, or any biochemical molecule that is detectable by spectroscopic techniques. For example, the analyte molecule may be a Raman-active molecule detectable by Raman spectroscopy. The analyte molecule may be present at a low concentration, such as from about $10^{-10}$ M to about $10^{-5}$ M.

A plasma is produced in contact with the surface of the electrolyte at atmospheric pressure to generate a current through the electrolyte, where the plasma acts as a second electrode, and metal ions in the electrolyte are reduced by free electrons from the plasma to form metal nanoparticles in the electrolyte, as described above. The metal ions in the electrolyte may be produced by anodic dissolution of the first electrode, and/or the electrolyte may include a metal salt that provides the metal ions. When a metal salt is employed, a typical concentration in the electrolyte is from about 1 µM to about 1 mM, although other concentrations are possible.

As the plasma is generated, an increasing number of metal ions are reduced and, consequently, an increasing number of metal nanoparticles are generated in the electrolyte. The plasma may be generated for at least about 2 minutes, at least about 5 minutes, at least about 10 minutes, at least about 15 minutes, or at least about 20 minutes. The increase in nanoparticle concentration continues until the metal ions in the electrolyte are depleted, which may be after about 20 minutes. As the metal nanoparticles form, they interact with the analyte molecules in the electrolyte, with the interactions increasing as the nanoparticle concentration rises. Because the surfaces of the nanoparticles do not need to be coated with a foreign stabilizer molecule (which is often employed in solution-based synthesis approaches to reduce agglomeration of the particles), the particle surfaces are clean and well-suited for interactions with the analyte molecules. As discussed further below, interactions between the metal nanoparticles and the analyte molecules increase the Raman scattering signal produced by the analyte. Consequently, very low analyte concentrations may be detected with this method.

Experiments involving crystal violet (CV) as the analyte molecule employ the apparatus shown schematically in FIG. 1. The hybrid electrochemical cell consists of a Pt metal foil anode (1 cm×1 cm, 0.001" thick, ESPI Metals, Inc.) immersed in an aqueous electrolyte and a stainless-steel capillary tube cathode (5 cm length×180 µm hole diam., Varian, Inc.) positioned 3 cm away and 1 mm above the solution surface. The capillary tube may be pressurized with argon (Ar) gas at a constant flow rate of 25 sccm. The electrolyte contains 1 mM $AgNO_3$ and a target molecule, CV, in deionized water; CV is chosen for this study because of its well-known SERS spectrum. The initial concentration of CV in the solution is varied between 10 µm and 100 pM. The Ag nanoparticles are synthesized in the presence of CV to ensure intimate contact between the particle surface and the molecules. The microplasma is ignited with a negatively-biased dc power supply and sustained at a constant plasma voltage and current of 290 V and 2 mA, respectively. Immediately following plasma formation, the solution changes color, indicating particle nucleation. The cell may be operated for different times ranging from, in this example, 1 minute to 30 minutes.

Samples are optically characterized by ultraviolet-visible (UV-Vis) absorbance with a Shimadzu UV-1800 spectrometer. All absorbance spectra are background subtracted with de-ionized water. The size and morphology of as-grown nanoparticles are characterized by transmission electron microscopy (TEM). Nanoparticles are drop-cast and dried in room air on carbon-coated copper TEM grids. TEM images are obtained on a Philips Tecnai F30 field emission microscope operated at 300 kV. Micro Raman spectroscopy is performed using a Jobin-Yvon Horiba LabRam system with a He—Ne laser (17 mW, 633 nm). Raman spectra are obtained from a 1 mL drop of each solution placed in a 200 µm thick well of a substrate and covered with glass to prevent evaporation.

In a typical experiment, igniting the microplasma with the solution causes a color change as a result of particle growth. The particles are observed to nucleate at the plasma-liquid interface and diffuse into the solution volume. Prior experiments suggest that gas-phase electrons created in the microplasma are responsible for reducing the metal ions and nucleating particles. UV-vis absorbance spectra are shown in FIG. 5(*c*) for solutions of Ag nanoparticles grown with $10^{-5}$ M CV for different process times. The well-known surface plasmon resonance (SPR) peak for Ag appears in all the spectra at approximately 400 nm and increases in intensity as the particle density grows in solution. An intense absorbance band corresponding to CV is also present in the spectra between 450 and 650 nm; for comparison, the absorbance spectrum of the initial CV solution with no Ag particles is included in FIG.

5(c). The intensity of this band is found to decrease as particles form in solution, suggesting that the CV absorbance may be quenched as a result of interaction with Ag nanoparticles. In order to decouple the strong CV absorbance from the Ag SPR peak, Ag nanoparticles are also prepared with fructose which does not absorb in the wavelength range of interest. The spectra in FIG. 5(a) clearly show the SPR peak for Ag nanoparticles and an increase in its intensity as a result of rapid particle growth. Overall, the strong intensity of the SPR peak makes these materials potentially useful for SERS applications.

TEM analysis of the as-grown Ag nanoparticles confirms that particles are non-agglomerated, spherical, and uniform. HRTEM reveals that the particles are crystalline with a lattice spacing of 0.20 nm which compares favorably to the (200) crystalline plane of fcc Ag. A histogram of particle diameters derived from the microscopy images indicates a mean diameter of 7.5 nm and a standard deviation of 2.0 nm. The present investigation has shown that variation of the process time or other parameters such as the discharge current does not significantly alter the particle size distribution, but increases the particle density and leads to particle agglomeration. While further experiments may be necessary to fully understand the mechanism for particle nucleation and growth, the inventor believes the particle size is controlled by the reaction volume, which can be defined as a small region near the microplasma-liquid interface. The experimental observations suggest that particle nucleation is driven by the electromigration of Ag cations to this region and subsequent electrochemical reduction by the microplasma. Growth then occurs until particles are carried out of the reaction volume by convective or diffusive flow back into the bulk of the solution. Thus, it can be inferred that the size distribution of the as-grown particles is largely unaffected by the process time and remains the same in all of the experiments.

Figure 8A:
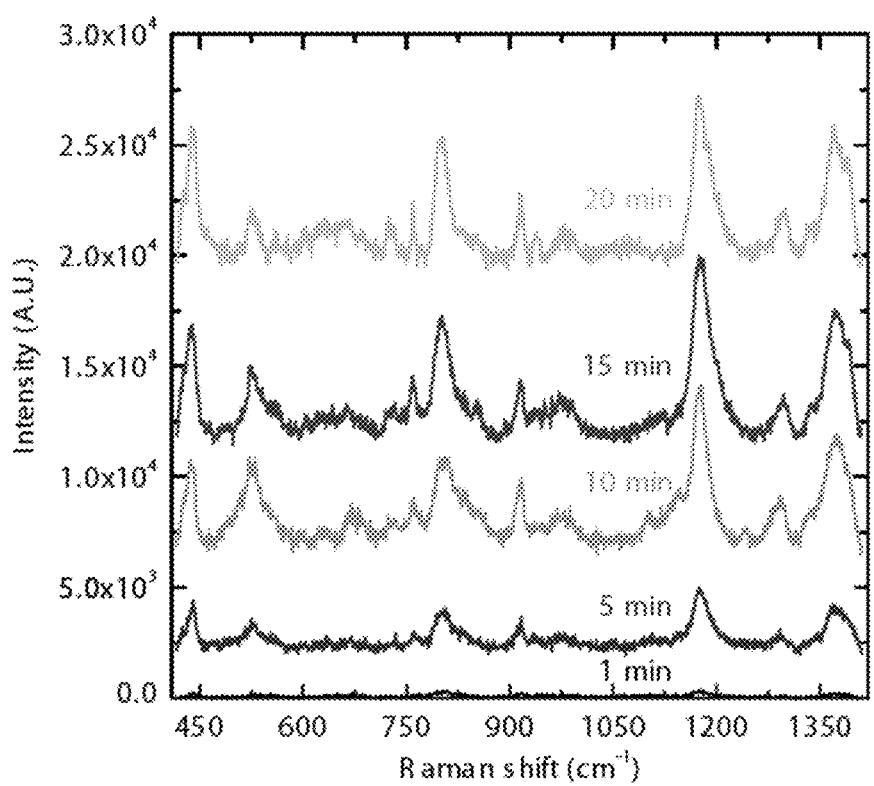
FIGS. 8(a)-8(b) show (a) SERS spectra as a function of process time for solutions containing $10^{-5}$M CV and (b) SERS spectra as a function of initial CV concentration in solution (process time is 20 minutes)

To evaluate the influence of Ag nanoparticles on the Raman scattering signal from CV solutions, the process time (time during which the plasma is produced) may be varied for a constant CV concentration. FIG. 8(a) shows Raman spectra collected from a series of samples, each with $10^{-5}$ M CV, prepared with Ag nanoparticles for the indicated time. For the given instrument parameters, no peaks are visible in the spectrum after 1 min. At 5 min, the characteristic Raman peaks for CV are visible at approximately 441, 799, 916, 1176, and 1376 cm$^{-1}$. As the process time is increased, the intensities of these peaks grow significantly. After 20 min, these modes dominate the Raman spectrum, but other lines corresponding to weaker excitations are also visible at 528, 728, 761, 916, 940, 978, and 1301 cm$^{-1}$.

Figure 8B:
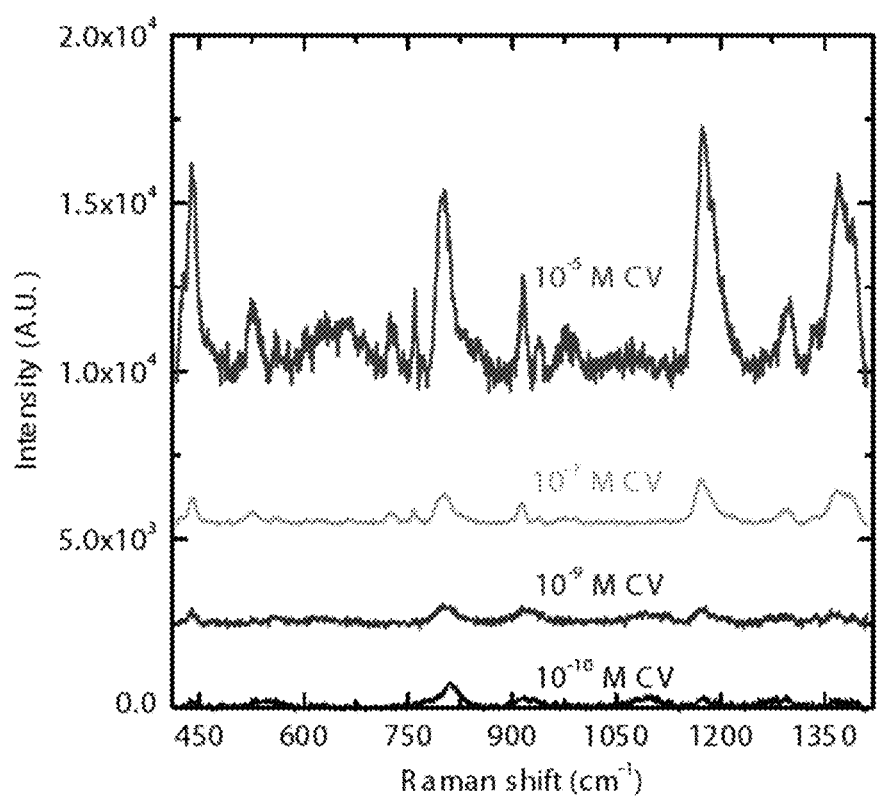

These experiments are repeated for different CV concentrations, and it is found that the optimal time to obtain a maximum Raman scattering signal is approximately 20 minutes for each CV concentration. In FIG. 8(b), Raman spectra are shown for solutions with decreasing initial concentrations of CV from $10^{-5}$ to $10^{-10}$ M CV. Raman modes for CV are discernable down to a concentration of 100 μM. Some of these experiments are repeated by first preparing Ag nanoparticles, then adding the CV to the solutions, but it is found that the intensity of the scattered signals is much weaker. This indicates that the synthesis of Ag nanoparticles with the target molecule improves the interaction between the particles and the target molecules necessary for SERS enhancement.

Figure 9:
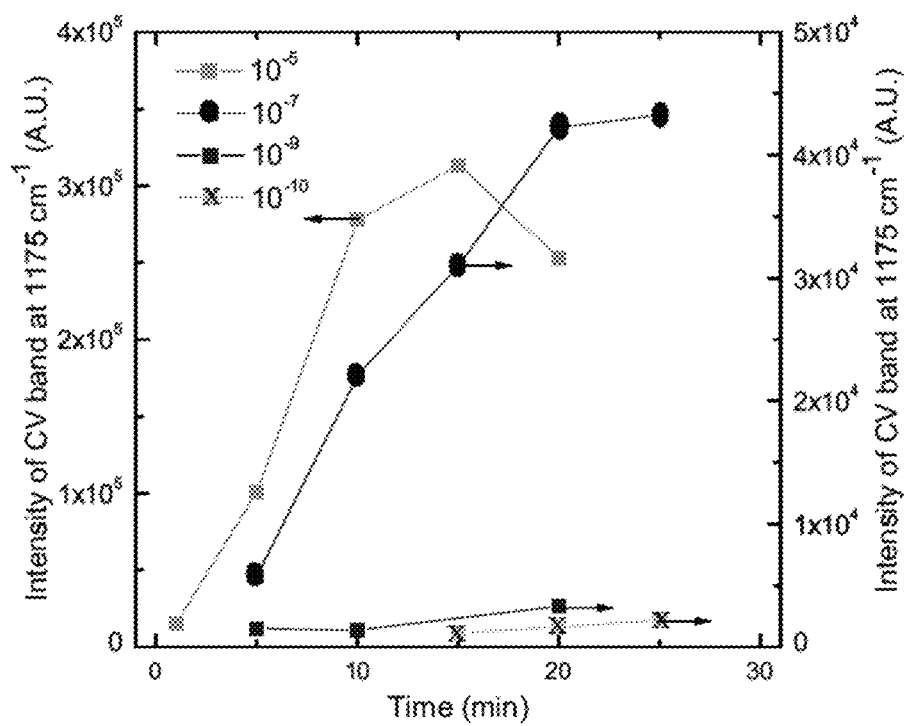
FIG. 9 shows the intensity of CV band centered at 1175 $cm^{-1}$ versus process time for various initial concentrations of CV.

The SERS enhancement is observed to depend on two key factors: the excitation of surface plasmons in the metal nanoparticles and the proximity of the analyte molecules to the metal surface. For a given metal material, e.g. Ag, the SERS enhancement is found to be particularly strong at the junction of two or more nanoparticles, referred to as "hot spots," where an analyte molecule is trapped and the electromagnetic field is concentrated. Aggregates of metal nanoparticles can yield significant enhancements because of numerous and random junction sites that increase the number of these hot spots. In the experiments described here, operating the cell for longer times leads to rapid particle growth and high particle densities, as indicated by UV-vis absorbance. However, as previously described, the particle size does not change. Therefore, the rapid increase in the SERS signal shown in FIG. 9 for various CV experiments is explained by particle agglomeration and effective trapping of the CV molecules. It is notable that this amplification of the Raman signal is achieved without adding any reagents such as NaCl to induce agglomeration. At longer times (>20 min), the metal salt is depleted, particle growth and agglomeration stop, and the SERS signal reaches a maximum. Overall, the time required to achieve a sufficient particle density for enhancement appears to be independent of the initial CV concentration.

A simple one-step process has been described to synthesize Ag colloids for SERS applications by microplasma reduction of aqueous metal ions. The preparation of Ag nanoparticles directly in the presence of a target molecule, such as CV, allows detection of low concentrations of analytes by a SERS-related enhancement of the Raman scattering signal. The time-dependent behavior of the SERS spectra may be useful for further studies to relate the effect of particle concentration and agglomeration on the enhancement factor.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment.

The invention claimed is:

1. An electrochemical cell having a closed circuit configuration comprising:
   an open container at atmospheric pressure comprising a liquid electrolyte;
   a first electrode at least partially immersed in the liquid electrolyte;
   a plasma source spaced apart from a surface of the liquid electrolyte by a predetermined spacing; and
   a plasma spanning the predetermined spacing to contact the surface of the liquid electrolyte,
   wherein the plasma source comprises a hollow conductive body including a first opening and a second opening and a cavity therebetween, the first opening comprising a gas inlet to the cavity and the second opening being separated from the surface of the liquid electrolyte by the predetermined spacing.

2. The electrochemical cell of claim 1, wherein the first electrode is fully immersed in the liquid electrolyte.

3. The electrochemical cell of claim 1, wherein the liquid electrolyte comprises an aqueous solution.

4. The electrochemical cell of claim 1, wherein the liquid electrolyte comprises at least one of an acid, a metal salt, and a stabilizer.

5. The electrochemical cell of claim 4, wherein the first electrode comprises a metal selected from the group consisting of Ag, Al, Au, Fe, Pt, and Cu, and wherein the acid is an etchant of the metal.

6. The electrochemical cell of claim 1, wherein the plasma serves as a second electrode.

7. The electrochemical cell of claim 1, wherein the plasma source is electrically connected to a power supply and the first electrode is electrically connected to ground.

8. The electrochemical cell of claim 1, wherein the predetermined spacing is between about 0.5 mm and about 5 mm.

9. The electrochemical cell of claim 1, wherein the hollow conductive body is a conductive tube.

10. The electrochemical cell of claim 9, wherein the cavity of the conductive tube comprises a diameter of about 200 microns or less.

11. A method of operating an electrochemical cell, the method comprising:
providing a first electrode at least partially immersed in a liquid electrolyte comprising an aqueous solution;
producing a plasma in contact with a surface of the liquid electrolyte at atmospheric pressure to generate a current through the liquid electrolyte, the plasma acting as a second electrode;
initiating electrochemical reactions in the liquid electrolyte involving at least the second electrode,
wherein producing the plasma comprises: flowing a gas through a hollow conductive body including a first opening and a second opening and a cavity therebetween, the first opening comprising a gas inlet to the cavity and the second opening being separated from the surface of the liquid electrolyte by a predetermined spacing; and applying a voltage across the hollow conductive body and the first electrode.

12. The method of claim 11, wherein the electrochemical reactions include reduction of metal ions in the liquid electrolyte by free electrons from the plasma.

13. The method of claim 12, wherein the electrochemical reactions include anodic dissolution of the first electrode to produce the metal ions in the liquid electrolyte.

14. The method of claim 12, wherein the liquid electrolyte includes a metal salt, the metal salt providing the metal ions.

15. The method of claim 11, wherein the current generated through the liquid electrolyte is between about 1 mA and 10 mA.

16. The method of claim 11, wherein the predetermined spacing is between about 0.5 mm and about 5 mm.

17. A method of producing metal nanoparticles, the method comprising:
providing a first electrode at least partially immersed in a liquid electrolyte at ambient temperature, the liquid electrolyte including an analyte molecule;
producing a plasma in contact with a surface of the liquid electrolyte at atmospheric pressure to generate a current through the liquid electrolyte, the plasma acting as a second electrode;
reducing metal ions in the liquid electrolyte by free electrons from the plasma to form metal nanoparticles in the liquid electrolyte.

18. The method of claim 17, wherein the metal ions in the liquid electrolyte are generated by anodic dissolution of the first electrode.

19. The method of claim 17, wherein the liquid electrolyte includes a metal salt, the metal salt providing the metal ions.

20. The method of claim 17, wherein the analyte molecule is present in the liquid electrolyte at a concentration of from about $10^{-10}$ M to about $10^{-5}$ M.

21. The method of claim 17, wherein the analyte molecule is a Raman-active molecule.

22. The method of claim 17, further comprising detecting a signal from the analyte molecule.

23. The method of claim 22, wherein the signal is a Raman scattering signal.

24. The method of claim 22, wherein the signal is detected as the plasma is produced.

25. The method of claim 17, wherein the plasma is produced for a time duration of at least about 5 minutes, a concentration of the metal nanoparticles in the liquid electrolyte increasing during the time duration.

26. The method of claim 25, wherein the time duration is at least about 15 minutes.

* * * * *